United States Patent
Tariq et al.

(10) Patent No.: US 6,907,501 B2
(45) Date of Patent: Jun. 14, 2005

(54) SYSTEM FOR MANAGEMENT OF CACHEABLE STREAMING CONTENT IN A PACKET BASED COMMUNICATION NETWORK WITH MOBILE HOSTS

(75) Inventors: Muhammad Mukarram Bin Tariq, San Jose, CA (US); Atsushi Takeshita, Sunnyvale, CA (US)

(73) Assignee: NTT DoCoMo Inc., Tokyo (JP)

(*) Notice: Subject to any disclaimer, the term of this patent is extended or adjusted under 35 U.S.C. 154(b) by 349 days.

(21) Appl. No.: 10/056,938

(22) Filed: Jan. 25, 2002

(65) Prior Publication Data

US 2003/0145038 A1 Jul. 31, 2003

(51) Int. Cl.⁷ .............................................. G06F 12/00
(52) U.S. Cl. ...................................... 711/118; 455/439
(58) Field of Search ............................... 455/437–456.6; 709/200–203, 212–219, 226, 231–232, 225, 238–239; 711/118–129; 370/351

(56) References Cited

U.S. PATENT DOCUMENTS

| | | | | |
|---|---|---|---|---|
| 5,715,395 | A | * | 2/1998 | Brabson et al. ............. 709/226 |
| 5,898,780 | A | * | 4/1999 | Liu et al. ..................... 713/155 |
| 6,263,369 | B1 | * | 7/2001 | Sitaraman et al. .......... 709/225 |
| 6,466,964 | B1 | * | 10/2002 | Leung et al. ................ 709/202 |
| 6,535,493 | B1 | * | 3/2003 | Lee et al. .................... 370/329 |
| 6,622,157 | B1 | * | 9/2003 | Heddaya et al. ............ 709/202 |
| 6,625,135 | B1 | * | 9/2003 | Johnson et al. ............. 370/332 |
| 6,636,522 | B1 | * | 10/2003 | Perinpanathan et al. .... 370/409 |
| 2002/0094813 | A1 | * | 7/2002 | Koshimizu et al. ......... 455/436 |
| 2003/0091011 | A1 | * | 5/2003 | Roberts et al. ............. 370/338 |

FOREIGN PATENT DOCUMENTS

| | | |
|---|---|---|
| EP | 0676898 A1 | 10/1995 |
| EP | 1039721 A2 | 9/2000 |
| WO | WO01/98920 A1 | 12/2001 |

OTHER PUBLICATIONS

Sung–Ju Lee, Wei–Ying Ma, and Bo Shen, "An Interactive Video Delivery and Caching System Using Video Summarization," Web Caching and Content Distribution (WCW) Jun. 1, 2001.

Markus Hofmann, T.S. Eugene NG, Katherine Guo, Sanjoy Paul, Hui Zhang, "Caching Techniques for Streaming Multimedia Over the Internet," Mar. 27, 2001, http://citeseer.nj.nec.com/hofmann99caching.html.

(Continued)

Primary Examiner—Nasser Moazzami
(74) Attorney, Agent, or Firm—Edward C. Kwok; MacPherson Kwok Chen & Heid LLP

(57) ABSTRACT

A cache handoff system for managing cacheable streaming content requested by a mobile node within a network architecture is disclosed. The network architecture includes a first subnet and a second subnet. The cache handoff system includes a first caching proxy operable in the first subnet to supply a content stream in response to a request of the mobile node operable in the first subnet. In addition, the cache handoff system includes a second caching proxy operable in the second subnet. The first caching proxy may initiate a cache handoff of the request to the second caching proxy when the mobile node relocates to the second subnet. The second caching proxy may seamlessly continue to supply the requested content stream as a function of the cache handoff.

47 Claims, 5 Drawing Sheets

OTHER PUBLICATIONS

University of California, Los Angeles Computer Science Department and Lawerence Berkeley National Labs Network Research Group, Adaptive Web Caching Project; http://irl.cs.ucla.edu/awc/home.html.

"Squid Web Proxy Cache," http://www.squid-cache.org., 2000.

"RealSystem Proxy 8,"Real Networks, 2000; http://service/real.com/help/library/whitepapers/rproxy/htmfiles/proxy22.htm.

B. Wang, S. Sen, M. Adler and D. Towsley, "Proxy–Based Distribution of Streaming Video Over Unicast/Multicast Connections TITLE2," *The UMass–Amherst Dept. of Computer Science*, Amherst, Massachusetts, Mar., 2001, http://www.cs.umass.edu/Dienst/UI/2.0/Describe/ncstrl.u-masssa_cs%2FUM–CS–2001–005.

Ethendranath Bommaiah, Katherine Guo, Markus Hofmann, Sanjoy Paul, "Design and Implementation of a Caching System for Streaming Media over the Internet," in Proceedings of the Sixth IEEE Real Time Technology and Applications Symposium (RTAS 2000), http://citeseer.ni.nec.com/308580.html.

Renu Tewari, Harrick, M. Vin, Asit Dan and Dinkar Sitaram, "Resource–based Caching for Web Servers," in Proceedings of SPIE/ACM Conference on Mulitmedia Computing and networking, Jan. 1998, http://citeseer.nj.nec.com/context/40637/30630.

D.Wessels, K. Claffy, "Application of Internet Cache Protocol (ICP), Version 2," IETF RFC–1287 Sep. 1997.

D.Wessels, K. Claffy, "Internet Cache Protocol (ICP), Version 2," IETF RFC–1286, Sep. 1997.

Vinod Valloppillil, Keith W. Ross, "Cache Array Routing Protocol v1.0," Internet Draft Feb. 26, 1998, http://icp.i-rache.ne/carp.txt.

Hamilton, Martin et al. "Cache Digest Specification—version 5" JANET Web Cache Service, XP–002277402, pp. 1–7.

Caceres, Ramon et al. "Fast and Scalable Wireless Handoffs in Support of Mobile Internet Audio" Mobile Networks and Applications 3 (1998) 351–363, XP–002135845, pp. 351–363.

Hadjiefthymiades, Stathes et al. "A Resource Management Scheme for Efficient WWW Computing in Wireless Communications" Communication Networks Laboratory, Department of Informatics, University of Athens, Athens 15784 Greece, 1999 IEEE, p. 1755–1759.

* cited by examiner

SYSTEM FOR MANAGEMENT OF CACHEABLE STREAMING CONTENT IN A PACKET BASED COMMUNICATION NETWORK WITH MOBILE HOSTS

FIELD OF THE INVENTION

The present invention relates generally to streaming content over a network and more particularly, to methods and systems for managing cacheable streaming content delivered to mobile nodes in packet based communication networks.

BACKGROUND OF THE INVENTION

The use of streaming multimedia content is gaining popularity as Internet connectivity is becoming increasingly ubiquitous, permeate, fast and reliable. In addition, better and faster audio-visual compression/decompression technologies have made the streaming of multimedia content possible over large networks that may include the Internet. As a result, such networks are becoming not just a source of connectivity for communication, but also a source of streaming multimedia content for both education and entertainment.

Despite improvements in compression/decompression and improved Internet access speeds, streaming multimedia still consumes large amounts of resources with regard to the server of the content as well as available bandwidth of networks. Several techniques have been developed in an effort to address the problem of significant loading on networks and/or servers caused by streaming multimedia. One well established technique for reducing such loading involves some form of caching of the streaming content. In general, caching is a form of duplicated data storage in which the streaming content is cached at a location separate from the server acting as the source of the content. By fulfilling requests for the streaming content from a cache instead of the server, the loading on the server may be reduced. Another established technique involves locating the cache in close proximity to the request for the streaming content. Due to the close proximity, the response time may be improved and loading on the network may be decreased.

Typically, caching of streaming content is employed within a content distribution network to maintain close proximity to requests for such content. In general, content distribution networks may have hierarchical and/or distributed caching systems. In hierarchical systems, individual caches are organized in a hierarchy. Distributed caching systems rely on an overlapping mesh formed by the caches. In both types of systems, however, individual caches have a limited scope (geographically or logically) within which to provide caching services. Generally, an intermediate entity such as, for example, a proxy server receives requests from clients for streaming content. The intermediate entity typically serves a group of clients located in a relatively small geographical area. Other intermediate entities within the content distribution network serve clients in other geographical areas.

Upon receipt of a request for streaming multimedia content, the intermediate entity typically checks with associated cache(s) for availability. If the content is unavailable, the request is typically relayed to another (possibly higher level) intermediate entity or the original source of the streaming content. Accordingly, each cache serves client's requests within a finite operational area referred to as a subnet.

In the future, mobile nodes, such as wireless phones, personal digital assistants (PDAs) and other mobile communication/computing devices shall be enabled for high-speed Internet access via mobile networks. Accordingly, such mobile nodes may contribute an increasing share of multimedia content to overall network traffic, to the point of eventually surpassing traditional voice traffic.

The presence of such mobile nodes presents new challenges for distributed caching systems. As mobile nodes move within mobile networks, the systems accommodate the movement among different subnets. Within existing systems and networks, the underlying mobile network will typically try to forward streaming multimedia traffic to the mobile node's new subnet.

For example, with Mobile Internet Protocol (IP), communication with a roaming mobile node may be passed through a home address of the mobile node prior to being sent to the subnet in which the roaming mobile node is located. Alternatively, the roaming mobile node may provide a care of address identifying a new subnet of the roaming mobile node. Communications may then be directed to the new subnet. Such communication may include streaming multimedia being served by a cache in the subnet that the mobile node occupied when the request for streaming multimedia was made by the mobile node. As a result, inter-subnet traffic may increase, which may lead to network congestion. Increases in inter-subnet traffic may increase delays, degraded quality of service and otherwise undermine the purpose of serving streaming multimedia content from a cache in close proximity to the client.

Another issue involves movement of mobile nodes among heterogeneous networks. Mobile nodes such as, for example, those in a cellular mobile network typically move to physically adjacent parts (subnets) of the mobile network. Physically adjacent parts of a mobile network, or two overlapping/adjacent mobile networks, however, may not mean that the mobile node's new location is logically adjacent to the mobile node's previous location. For example, the handoff of communications with a roaming mobile node from a cellular network to a wireless LAN that are physically close together, may be far away in terms of logical distance (such as IP hops distance). Such large logical distances may further increase delay, network traffic congestion and degradation of quality of service when streaming multimedia content is being served to a roaming mobile node.

SUMMARY OF THE PRESENT INVENTION

The presently preferred embodiments disclose a cache handoff system for managing streaming content within a network architecture that includes a content distribution network. In response to the movement of mobile nodes within the network architecture, the cache handoff system may perform a cache handoff. Cache handoffs maintain the service of cacheable streaming content in close logical proximity to the mobile nodes being served. The cache handoff system performs cache handoffs to minimize the amount of inter-subnet traffic created by roaming mobile nodes.

As roaming mobile nodes request streaming content, the supply of streaming content in response to the request may be handed off based on the current location of the mobile node. Accordingly, the logical distance between the mobile nodes and the supply of streaming content may be kept relatively small as the mobile node roams. The cache handoff system may perform cache handoffs of requests by mobile nodes and also actively manage cached content to effectively and efficiently fulfill requests while minimizing delay, network traffic congestion and degradation of quality of service.

The cache handoff system of one exemplary embodiment comprises at least one mobile node operating in a network architecture that includes a first subnet and a second subnet. In addition, the cache handoff system includes at least one first caching proxy operating in the first subnet and at least one second caching proxy operating in the second subnet. The first caching proxy may serve a request by the mobile node for a content stream while the mobile node is operating within the first subnet. When the mobile node relocates to the second subnet, the request may be handed off to the second caching proxy. The second caching proxy may then continue serving the content stream.

The portion of the content stream being served by each of the first and second caching proxies may be cached within the respective caching proxies. When a cache handoff occurs, caching as well as serving of the content stream by the first caching proxy is discontinued. Accordingly, the cache handoff system may include variably sized fragments of content streams (or entire content streams) spontaneously and randomly cached in caching proxies. The random distribution of the fragments (and entire content streams) is a function of the relocation of the mobile node within the network architecture. The content cached within each of the caching proxies may be representative of different content streams served to the mobile node by the caching proxies.

The cache handoff system may manage the content by quantizing each of the fragments to achieve a uniform sized block of content. Quantizing involves deleting some of a fragment or fetching additional content stream to add to a fragment. Following quantization, coordination of the caching proxies may be performed with the cache handoff system. Coordination may involve selectively directing the various caching proxies to cooperatively operate in serving requests for streaming content utilizing the cached quantized fragments.

An interesting feature of the cache handoff system involves cache handoff communications. In one embodiment, a caching proxy currently serving a request may subscribe to the mobility status of the mobile node that made the request. When the mobile node subsequently roams to another location, the caching proxy may be notified. Upon notification, the serving caching proxy may initiate a cache handoff to another caching proxy in closer logical proximity to the current location of the mobile node.

Another interesting feature of the cache handoff system relates to coordination of the caching proxies. Random and spontaneous distribution of the quantized fragments may occur anywhere in the network architecture. Accordingly, coordination information communicated by the caching proxies may include not only the identity of the streaming content that each quantized fragment is part of, but also identification of the sequential portion of the streaming content the quantized fragment represents.

Yet another interesting feature of the cache handoff system involves duplication and redundancy created by the random and spontaneous distribution of the fragmented and unfragmented content. The cache handoff system may rank the content with identified criteria and control the level of duplication and redundancy as a function of the ranking.

Further objects and advantages of the present invention will be apparent from the following description, reference being made to the accompanying drawings wherein preferred embodiments of the present invention are clearly shown.

DETAILED DESCRIPTION OF THE PREFERRED EMBODIMENTS OF THE INVENTION

The presently preferred embodiments describe a cache handoff system for managing cacheable streaming content for mobile nodes operating in a network architecture. The network architecture includes a content distribution network for caching services related to streaming content. The cache handoff system directs a cache handoff of streaming content currently being served to a mobile node as the mobile node roams within the network architecture. The cache handoff allows the uninterrupted supply of streaming content from a cache in close proximity to the mobile node. Accordingly, traffic within the network is minimized while delays, congestion and degradation of the quality of service may be avoided.

Figure 1:
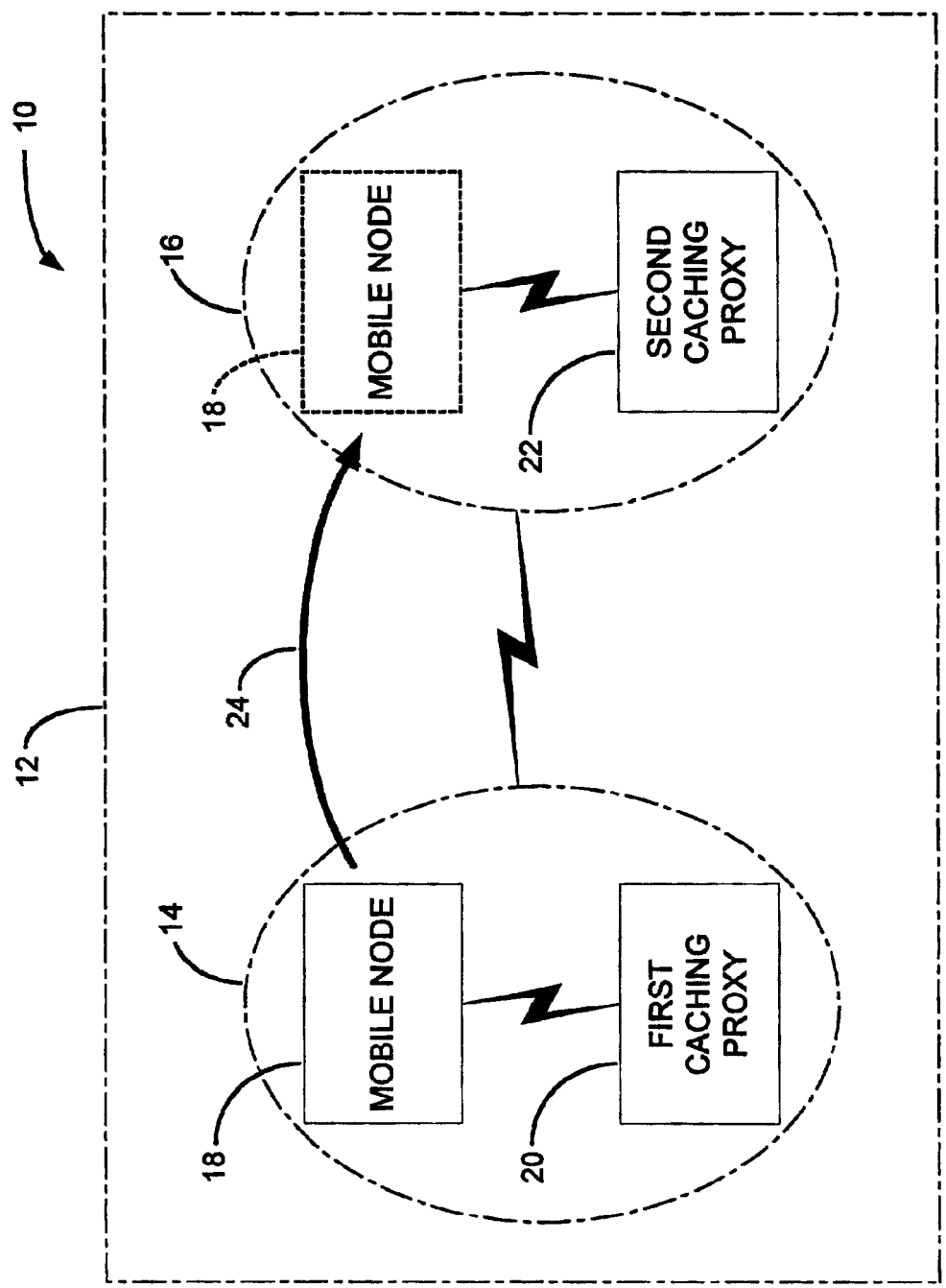
FIG. 1 is a block diagram of an embodiment of a cache handoff system.

FIG. 1 is a block diagram of one embodiment of a cache handoff system 10. The cache handoff system 10 operates in a network architecture 12 that may include any number of subnets. The network architecture 12 is illustratively depicted in FIG. 1 as including a first subnet 14 and a second subnet 16. Each subnet 14, 16 may include any number of devices, such as, for example, routers, server computing devices, individual computing devices and any other devices capable of being coupled via the network architecture 12. In the illustrated example, the first subnet 14 includes at least one mobile node 18 and at least one caching proxy depicted as a first caching proxy 20 operative coupled as illustrated. The second subnet 16 of this exemplary network architecture 12 includes at least one caching proxy depicted as a second caching proxy 22. As used herein, the term "coupled", "connected", or "interconnected" may mean electrically coupled, optically coupled, wirelessly coupled and/or any other form of coupling providing an interface between systems, devices and/or components.

The network architecture 12 may be any form of packet-switched communication network(s) and may include communication over the Internet. An exemplary packet switched communication protocol is a transport control protocol/Internet protocol (TCP/IP) network protocol suite, however, other Internet Protocol based networks, proprietary protocol based networks, or any other forms of network protocols are possible. Communications may also include, for example, IP tunneling protocols such as those that allow virtual private networks coupling multiple intranets or extranets together via the Internet.

The first and second subnets 14, 16 form a portion of a hierarchy of subnets within the network architecture 12, and may be part of the same network, separate heterogeneous networks, and/or separate homogenous networks. Subnets are a network, or portion thereof, that share a common address component. The term "subnet" and "subnets" as used herein defines the lowest hierarchical level at which network layer mobility may be detected.

Overall administration as well as identification of subnets may be performed in a well-known manner with a network-connected device such as, for example, a router (not shown). In general, each router receives network traffic and forwards the traffic towards associated hosts (such as, for example, the mobile node 18). For example, in an IP network, a subnet typically includes devices (or hosts) coupled to the network that have IP addresses with the same prefix. In other embodiments, the first and second subnets 14, 16 may be configured by any other mechanism to group one or more hosts or otherwise establish a hierarchy of subnets.

In the illustrated embodiment, the first and second subnets 14, 16 may include public and/or private intranets, extranets, local area networks (LANs) and/or any other forms of network configuration to enable transfer of data and/or control information. Communication within the first and second subnets 14, 16 may be transmitted with a communication medium that includes wireline based communication systems and/or wireless based communication systems. The communication medium may be for example, a communication channel, radio waves, microwave, wire transmissions, fiber optic transmissions, or any other communication medium capable of transmitting data, audio and/or video packets of information. In the presently preferred embodiments, the first and second subnets 14 are part of at least one wireless access network, such as, for example, a cellular network, an 802.11b wireless LAN, a Bluetooth network, a Home Radio Frequency (HomeRF) network or any other type of wireless network.

The mobile node 18 may be any mobile device capable of communicating over the network architecture 12. In the presently preferred embodiments, the mobile node 18 is a wireless device such as, for example, a wireless phone, a personal digital assistant (PDA), a notebook computer or any other wireless mobile device utilized by an end user to interface with the network architecture 12. The term "end user" and "user" represents any operator of a mobile node 18.

The mobile node 18 operates in a mobile networking environment. In such an environment, a point of attachment of the mobile node 18 to the network architecture 12 may be changed as the mobile node 18 roams. For example, in a cellular network, base stations (not shown) operating as access nodes within the subnets 14, 16 may each provide a point of attachment for the mobile node 18. In this example, the point of attachment changes when the base stations hand off radio communications with the mobile node 18 as the geographic location of the mobile node 18 changes. The disconnection and reconnection of the point of attachment of the mobile node 18 with the network architecture 12 may occur automatically, with minimal or no service interruption or interaction by the user. Changes in the point of attachment of the mobile node 18 may occur within the same subnet, or among different subnets.

As illustrated in FIG. 1, the first subnet 14 and the second subnet 16 have different cache proxies associated therewith, namely, the first caching proxy 20 and the second caching proxy 22, respectively. Association refers to providing caching services for requests from devices (hosts), such as, for example, the mobile node 18, operating within the corresponding subnets 14, 16. The logical and/or geographical distance between devices within the first and second subnets 14, 16, and the first and second caching proxies 20, 22 may be one criterion for association of a caching proxy with a subnet.

The terms "caching services" and "caching" as used herein refer to the process of making local copies of content (in close proximity to the consumer of the content) to expedite the content fetching process and reduce load on the original source of the content. Caching may be done passively, for example, when a caching proxy makes a local copy of content that traverses it, so that future access to that content can be fulfilled locally. Alternatively caching may be performed actively, for example, when content is sought out and copied to local storage. Either and/or both types of caching may be performed in connection with the operation of the cache handoff system 10.

The first and second caching proxies 20, 22 may be any type of device capable of caching information, monitoring requests for information from a user of the mobile node 18 and supplying information in response to the requests. The caching capability of each of the first and second caching proxies 20, 22 may be provided by one or more caches associated therewith. In addition, the capability to monitor for requests and provide responses to such requests may be provided by one or more associated proxy servers capable of accessing the cache(s). The terms "caching proxy," "cache" and/or "caching server" may be used to describe the first and second caching proxies 20, 22. Although not illustrated, each subnet may also include multiple independent caching proxies.

The first and second caching proxies 20, 22 may be part of a content distribution network. The content distribution network may include a hierarchal caching configuration and/or a mesh caching configuration for supplying caching services in response to requests from the mobile node 18. Responses to the requests may be provided from cached content. Where the request cannot be fulfilled from cached content, the requested content may be acquired over the network architecture 12, cached, and also provided in response to the request.

Acquisition of content may involve well-known techniques for obtaining the requested content from another cache and/or the source of the requested content. Content may include audio, video, data, web pages, documents or any other information that may be requested and obtained over the network architecture 12. In the presently preferred embodiments of the cache handoff system 10, the content of interest that is cached and provided by the first and second caching proxies 20, 22 is streaming multimedia content. In other embodiments the cache handoff system 10 may be utilized for any other form of streaming content and/or other content capable of being cached by the first and second caching proxies 20, 22.

During operation, a user operating the mobile node 18 in the first subnet 14 may request streaming content such as, for example, a music video over the network architecture 12. The first caching proxy 20 may receive the request and begin supplying the streaming content. Meanwhile, the mobile node 18 may roam or otherwise change location, such that the point of attachment of the mobile node 18 changes, for example, from the first subnet 14 to the second subnet 16 as illustrated by arrow 24 in FIG. 1.

The cache handoff system 10 may monitor the location of the mobile node 18 with respect to the first caching proxy 20. Upon the change in point of attachment, the cache handoff system 10 may initiate a cache handoff to maintain close logical proximity between the mobile node 18 and the caching proxy supplying the streaming content. In general, the cache handoff involves identifying a caching proxy in close logical proximity to the current location of the mobile node 18 that is capable of fulfilling the existing request. In addition, the cache handoff includes directing the transfer of the existing request.

Directing the transfer may include, verification and authorization of the caching proxies and/or the mobile node 18. In addition, the transfer may be synchronized such that the handoff is seamless and remains transparent to the user operating the mobile node 18. Further, the transfer may include confirmation that the streaming media is large enough (e.g. of sufficient length and duration) to warrant such a handoff.

For example, when the mobile node 18 moves to the second subnet 16, the second caching proxy 20 may be identified to fulfill the existing request (along with any subsequent requests). Since the caching proxy fulfilling existing requests of the mobile node 18 may "move" with the mobile node 18, traffic over the network architecture 12 may be minimized while quality of service and transmission delays may be avoided.

Initialization and completion of the cache handoff may remain transparent to the mobile node 18, or may include involvement of the mobile node 18.

In one embodiment, a break and make method may be performed by the mobile node 18 to initiate a cache handoff. In this embodiment, following a change in point of attachment (for example from the first subnet 14 to the second subnet 16), the mobile node 18 may determine that the caching proxy (for example the first caching proxy 20) currently serving streaming content to the mobile node 18 is no longer the closest in logical distance.

The mobile node 18 may then initiate a cache query for a new potential set of caching proxies associated with the location (subnet) that includes the current point of attachment of the mobile node 18. The cache query may be a broadcast message for caching proxies, a multicast message based on a lookup mechanism or any other technique for identifying caching proxies in close logical proximity. The lookup mechanism may be some form of information store for obtaining identification of caching proxies based on the current point of attachment of the mobile node 18. The information store may be a central database, a distributed database, a broadcast message, a multicast message or any other information producing mechanism. The storage for the information store may be located in the mobile node 18, the caching proxies, at least one server and/or any other device(s) in the network architecture 12.

Using the information obtained from the query, the mobile node 18 may terminate the request for streaming content from the caching proxy in close logical proximity to the previous point of attachment (the first caching proxy 20). In addition, the mobile node 18 may establish a session with a target caching proxy currently in close logical proximity to the mobile node 18 (the second caching proxy 22). Establishment of a session involves directing a cache handoff in which the existing request is handed off from one caching proxy (the first caching proxy 20) to a target caching proxy (the second caching proxy 22). The transition in supply of streaming content may be performed with a well-known make-before-break technique in which a synchronized, seamless and smooth transition may occur.

In another embodiment, initiation of the cache handoff may be performed with the caching proxy (such as, for example, the first caching proxy 20) currently serving streaming content to the mobile node 18 in response to the request. In this embodiment, the first caching proxy 14, a router and/or the mobile node 18 may provide notification that the mobile node 18 has moved to a new subnet (such as, from the first subnet 14 to the second subnet 16). Following notification, the first caching proxy 14 may initiate a cache query for a potential new set of caching proxies in close proximity to the new location of the mobile node 18 as previously discussed.

Following identification of such target caching proxies, the caching proxy desiring to handoff the responsibility for fulfilling the request (in the above example the first caching proxy 20) may provide initiation of the cache handoff. For example, upon identifying the second caching proxy 22, the first and second caching proxies 20, 22 may cooperatively communicate to transfer the request and complete the cache handoff. In still other embodiments, any other device(s) operating inside or outside the network architecture 12 may monitor for movement of the mobile node 18 among the subnets and/or initiate a cache handoff.

In yet another embodiment, subscription and notification may be implemented within the cache handoff system 10. As described later in detail, subscription and notification involves communication between a caching proxy (such as the first caching proxy 20) currently serving streaming content to the mobile node 18, and at least one mobility status subscription server monitoring the location of the mobile node 18 within the network architecture 12. In general, using subscription and notification, the caching proxy currently serving streaming content may be subscribed to the mobility status of the mobile node 18. Accordingly, when the mobile node 18 relocates, the caching proxy currently serving streaming content may be notified of the relocation. Upon notification, a cache handoff may be initiated. The mobility status subscription server monitoring the mobility status of the mobile node 18 may be, for example, the mobile node 18, at least one caching proxy, at least one router, at least one server and/or any other network connected device(s) capable of monitoring the location of the mobile node 18 within the network architecture 12.

Figure 2:
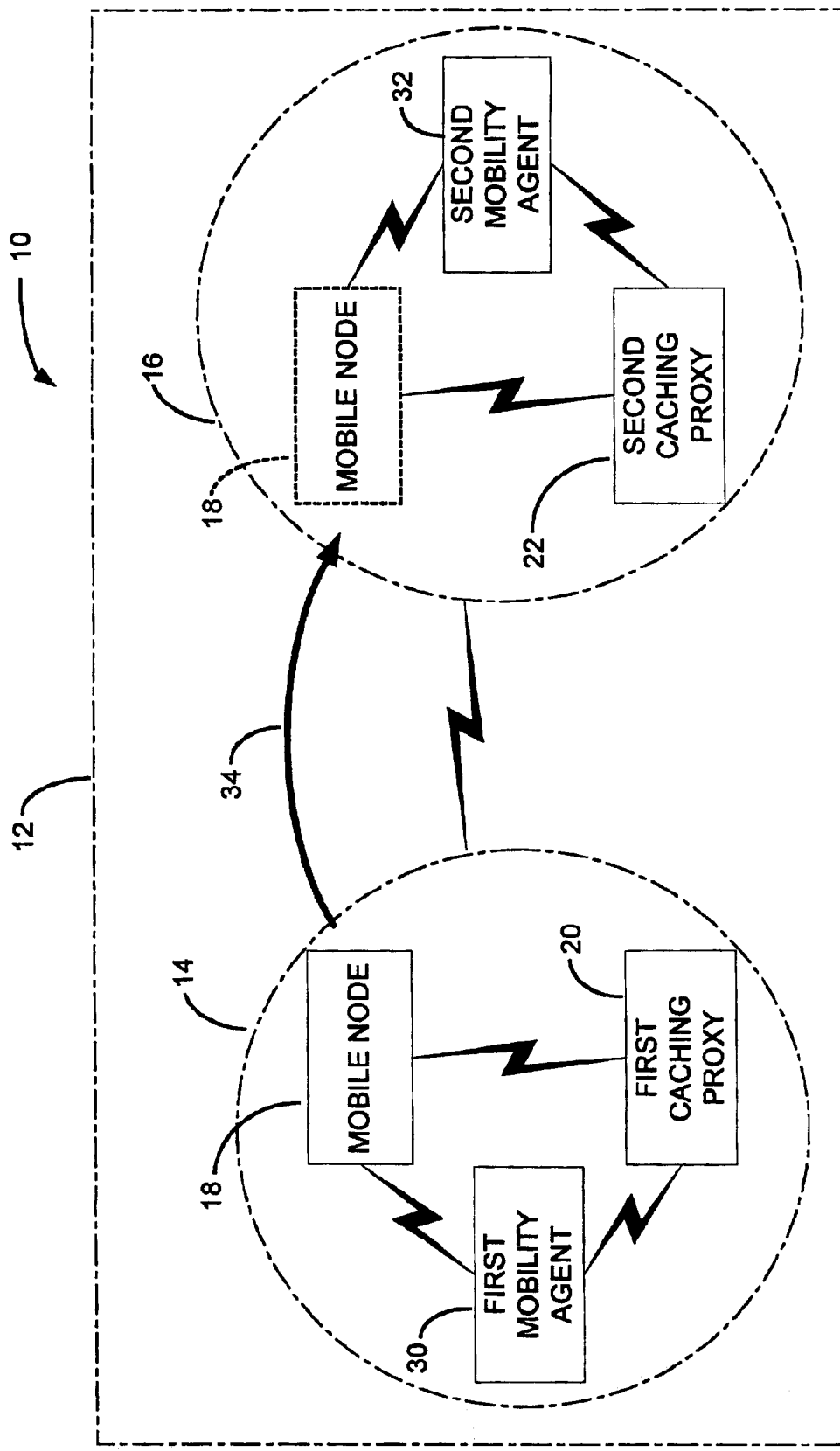
FIG. 2 is a block diagram of another embodiment of a cache handoff system.

FIG. 2 is another embodiment of the cache handoff system 10. The cache handoff system 10 operates in an exemplary embodiment of the network architecture 12 represented by the first subnet 14 and the second subnet 16 as in the previous embodiments. In addition, the first subnet 14 includes the previously discussed at least one mobile node 18 and the first caching proxy 20 as well as at least one first mobility agent 30 operatively coupled as illustrated in FIG. 2. Further, the second subnet 16 includes the previously discussed second caching proxy 22 operatively coupled with at least one second mobility agent 32 as illustrated. In other exemplary embodiments, the cache handoff system 10 may operate with any other configuration/quantities of subnets, cache proxies and mobility agents.

In the embodiment illustrated in FIG. 2, the network architecture 12 is a packet switching network serving the mobile node 18 with a communication protocol that is a Mobile Internet Protocol (IP). Mobile IP is a well-known protocol standard which includes version "4" (Mobile IPv4) and version "6" (Mobile IPv6). Within this embodiment, the first and second mobility agents 30, 32, may independently and/or cooperatively participate in a cache handoff by the cache handoff system 10.

The first and second mobility agents 30, 32 may be any form of network node capable of obtaining information regarding the mobility of the mobile node 18 within the first subnet 14 and the second subnet 16, respectively, as well as cooperatively operating within the cache handoff system 10. In one embodiment, the first and second mobility agents 30, 32 are access routers that operate to define and provide access to hosts within the first and second subnets 14, 16, respectively. In other embodiments, the first and second mobility agents 30, 32 may be servers dedicated to the cache handoff system 10 and/or servers partially utilized by the cache handoff system 10 such as, for example, access routers in a Mobile IP network. In still other embodiments, the first and second mobility agents 30, 32 may be any other device capable of detecting mobility of the mobile node 18 and operating within the network architecture 12.

In Mobile IPv4 and Mobile IPv6, interface of the mobile node 18 with the network architecture 12 may include designation of a home network for the mobile node 18. In the embodiment illustrated in FIG. 2, the designated home network for the mobile node 18 may include the first subnet 14. Similarly, subnets that are not part of the home network may be designated foreign networks. The second subnet 16 of this embodiment may be part of the home network or may be part of a foreign network. Within Mobile IP, the home network may provide a home address for communicating with the mobile node 18 regardless of the point of attachment of the mobile node 18 within the network architecture 12. In addition, the mobile node 18 may also maintain a care of address representing the current point of attachment of the mobile node 18 to the network architecture 12. The addresses may be, for example, an Internet protocol (IP) address. Addressing for the home address and care of address may be handled by the first and second mobility agents 30, 32 or by a separate access router in communication with the first and second mobility agents 30, 32.

Within an embodiment operating with Mobile IPv4, the first mobility agent 30 may operate as a home agent within the home network (first subnet 14) for the mobile node 18. In addition, the second mobility agent 32 may operate as a foreign agent in a foreign network (second subnet 16) for the mobile node 18. In other embodiments, the first and second mobility agents 30, 32 may both be foreign agents, or the first and second mobility agents 30, 32 may be foreign and home agents, respectively. Further, the first and second caching proxies 20, 22 may be assumed to be associated with the first and second subnets 14, 16, respectively. In this embodiment, the first and second mobility agents 30, 32 may begin the process of performing a cache handoff.

In one embodiment, subscription and notification is implemented within the cache handoff system 10. In this embodiment, the mobility status subscription server monitoring the location of the mobile node 18 within the network architecture 12 may be the home agent of the mobile node 18. Accordingly, in parallel with serving a request from the mobile node 18 for streaming content, the first caching proxy 20 of this embodiment may also communicate with the home agent, for example the first mobility agent 30.

Communication includes the transmission of subscribe/ notification information. Subscribe/notification information involves subscribing the first caching proxy 20 to the mobility status of the mobile node 18 and notification when the mobile node 18 has moved to a different subnet. Mobility status refers to information regarding the current location of the mobile node 18 and may include for example, the point of attachment, subnet location and/or any other information pertaining to the current location of the mobile node 18 in the network architecture 12.

Subscribing involves authentication of the first caching proxy 20 by the home agent. Authentication may include transmission of credentials of the first caching proxy 20 to the home agent. Credentials may include information similar to that required by well-known authentication systems and methods. In addition, identification of the mobile node 18 being served, such as, for example an IP address or other similar unique identifier may also be provided to the home agent. If the home agent is unable to authenticate the first caching proxy 20, a cache handoff may be precluded since the home agent may not provide notification to the first caching proxy 20 as the mobile node 18 roams.

Notification involves transmission of a notify message from the home agent to the first caching proxy 20 indicating that the mobile node 18 has relocated. The notify message also includes identification of the new subnet into which the mobile node 18 has roamed and the care of address of the mobile node 18 within the new subnet. As is standard in Mobile IPv4, the foreign agent operating in the new subnet may provide the new subnet and the care of address to the home agent. In addition, the underlying mobile network typically begins to forward traffic to the mobile node 18 in the new subnet. The forwarded traffic may include the streaming content served by the first caching proxy 20 until a cache handoff is completed.

In one embodiment, the previously described communication between the first caching proxy 20 and the home agent may be implemented with session initiation protocol (SIP) events notification methods. In other embodiments, any other proprietary or publicly available protocol may be used.

Based on notification by the home agent, the first caching proxy 20 may identify caching proxies within the new subnet using the previously described cache query. Further, the first caching proxy 20 may initiate a cache handoff with a chosen target caching proxy, such as, for example, the second caching proxy 22. The target caching proxy may accept the handoff even if the required content is not present at its local storage. In this case, the target caching proxy may fetch the content before starting to serve the request, or while the request is being served. If the cache handoff to the target caching proxy fails, then the first caching proxy 20 may continue to serve the mobile node 18. Following notification of failure, the first caching proxy 20 may choose and initiate a cache handoff with any other target caching proxies identified with the cache query. Notification of handoff failure may involve indication by the target caching proxy of an unsuccessful handoff, handoff monitoring by the first caching proxy 20 and/or any other failure notification mechanism. The mobile node 18 may also be advised of the status of the handoff by the first caching proxy 20 and/or the target caching proxy to allow the mobile node 18 to make any necessary adjustments.

Initiation of the cache handoff involves establishing communications between the first caching proxy 20 and the target caching proxy. Communications may involve the exchange of handoff information. The handoff information communicated to the target caching proxy may include identification of the mobile node 18 and request details, such as, for example, the URI of the requested content being served, the part of the streaming content currently being served, a source of the streaming content, or any other information pertaining to the request. In addition, the handoff information may include credentials to authenticate the caching proxies to each other as well as confirmation of the target caching proxy's ability to support the request. Further, synchronizing parameters for synchronization of the cache handoff may be included in the handoff information.

In another embodiment, the caching proxies may have to determine the home agent for the mobile node 18. Such as, for example, where there are multiple mobility agents in a subnet, or the mobile node 18 has roamed out of the home network prior to making a request to a caching proxy for streaming content. Determination of the home agent may include querying the mobile node 18, querying a database, obtaining the home agent as part of the request or any other mechanism for identifying the home agent of the mobile node 18.

Figure 3:
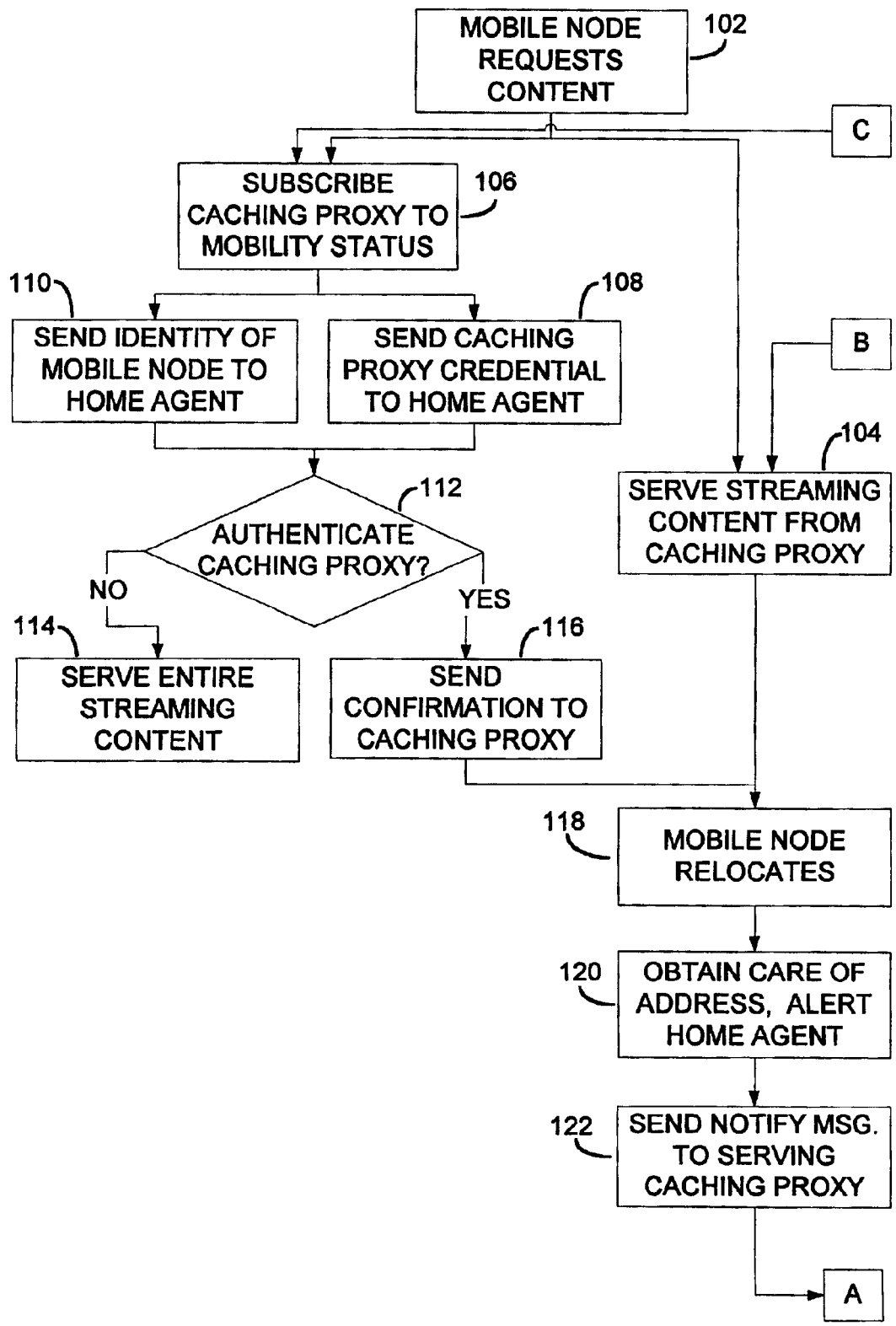
FIG. 3 is a flow diagram illustrating operation of one embodiment of the cache handoff system depicted in FIG. 2.

FIG. 3 is a block diagram illustrating operation of the embodiments illustrated in FIG. 2 using Mobile IPv4 during a cache handoff. In this exemplary description of operation, the mobile node 18 roams from the home network, in this example the first subnet 14, to a foreign network, in this example the second subnet 16 as illustrated by arrow 34. In other exemplary operations, the mobile node 18 may roam from one foreign network to another foreign network and/or the home network.

The operation begins at block 102 when the mobile node 18 makes a request for streaming content while operating in the first subnet 14. At block 104, the first caching proxy 20 receives the request and begins serving the streaming content to the mobile node 18. In parallel with serving the request, the caching proxy 20 also identifies the home agent (first mobility agent 30) and asks to subscribe the first caching proxy 20 to the mobility status of the mobile node 18 at block 106. At block 108, the first caching proxy 20 sends credentials to the home agent (first mobility agent 30) for authentication. The first caching proxy 20 also sends the identity of the mobile node 18 to the home agent (first mobility agent 30) at block 110. At block 112, the home agent (first mobility agent 30) determines if the first caching proxy 20 may be authenticated. If no, a cache handoff is precluded and the first caching proxy 20 serves the entire streaming content without regard to the location of the mobile node 18 at block 114. If the first caching proxy 20 can be authenticated, the home agent (first mobility agent 30) upholds the request and sends back a confirmation to the first caching proxy 20 at block 116.

At block 118, the mobile node 18 moves to a different location (second subnet 16) as illustrated by arrow 34. The foreign agent (second mobility agent 32) and the mobile node 18 obtain a care of address, and the mobile node 18 communicates the information to the home agent (first mobility agent 30) at block 120. At block 122 the first mobility agent 30 sends a notify message to the serving caching proxy (first caching proxy 20) to specify the new location of the mobile node 18 (e.g. within the second subnet 16).

Figure 4:
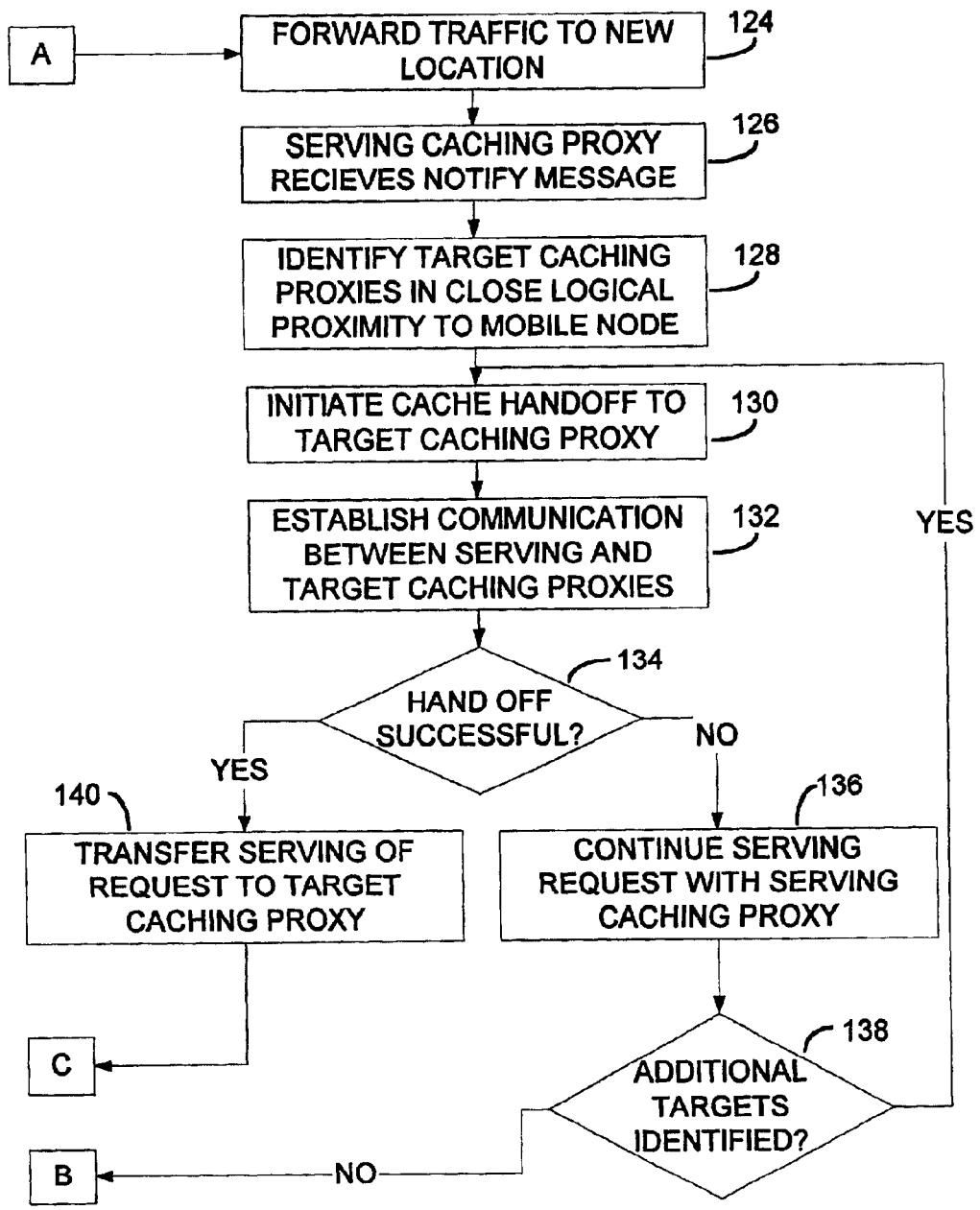
FIG. 4 is second portion of the flow diagram illustrated in FIG. 3.

Referring now to FIG. 4, the underlying mobile network also starts to forward traffic for the mobile node 18 (including the requested streaming content) to the new location at block 124. At block 126 the first caching proxy 20 is alerted to the new location of mobile node 18 with the notify message. The first caching proxy 20 initiates a cache query to identify target caching proxies in close logical proximity to the new location of the mobile node 18 at block 128. In this exemplary operation, the identified target caching proxy in close logical proximity to the location of the mobile node 18 is the second caching proxy 22 in the second subnet 16.

The first caching proxy 20 may then initiate a cache handoff to the second caching proxy 22 at block 130. At block 132 the first caching proxy 20 establishes communication with the second caching proxy 22. The success of the cache handoff is determined at block 134. If not successful, the streaming content continues to be served from the first caching proxy 20 at block 136. At block 138, the first caching proxy 20 determines if additional target caching proxies were identified in close logical proximity to the mobile node 18. If no, the streaming content continues to be served from the first caching proxy 20, and the operation returns to block 104. If additional target caching proxies were identified at block 128, another target caching proxy is chosen, and the operation returns to block 130.

If the handoff was determined to be successful at block 134, the first caching proxy 20 stops transmitting the content to the mobile node 18 and the second caching proxy 22 begins serving the content at block 140. The operation then returns to block 106 and the target caching proxy (second caching proxy 22), which is now the caching proxy serving the request, communicates subscribe/notification information to the home agent (first mobility agent 30) to subscribe to the mobility status of the mobile node 18.

Referring again to FIG. 2, in another embodiment, the cache handoff system 10 may be implemented with Mobile IPv6. In Mobile IPv6, binding updates provided by the mobile node 18 may be used for route optimization. The information provided in the binding updates may be used for several well-known application level optimizations including direct routing to avoid routing communications to the mobile node 18 via the home agent. The binding updates may also be utilized by the cache handoff system 10.

In one embodiment, the binding updates may be obtained by the cache handoff system 10 with conventional techniques that are part of standard Mobile IPv6 operation. In general, the techniques involve stateless address auto configuration for care-of addresses as well as proxy neighbor discovery techniques. In this embodiment, the caching proxy currently serving a request by the roaming mobile node 18 may receive the binding updates. Utilizing the binding update in a similar fashion to the notify messages of the previously described embodiments, the caching proxy may identify target caching proxies using a cache query, and initiate a cache handoff. Due to the binding updates, the previously described communication of subscribe/notification information with the home agent is unnecessary.

In another embodiment in which mobile IPv6 is implemented, binding updates may be obtained using an application protocol associated with the cache handoff system 10. In this embodiment, binding updates may be acquired by the caching proxy currently serving the request by first subscribing the caching proxy to the mobile node 18. For example, if a request for streaming content of the mobile node 18 is served by the first caching proxy 20, the first caching proxy 20 may subscribe to the mobility status of the mobile node 18.

Subscription and notification in this embodiment involves communication of subscribe/notification information similar to the previously described embodiments. In this embodiment, however, the communication is between the caching proxy serving the request and the mobile node 18. As such, when the mobile node 18 roams, for example from the first subnet 14 to the second subnet 16, the first caching proxy 20 is provided a notify message by the mobile node 18. In this embodiment, the notify message may be in the form of an application level binding update directed to the first caching proxy 20 when the mobile node 18 roams. Once the current location of the mobile node 18 is provided to the first caching proxy 20, the first caching proxy 20 may perform a cache query to identify candidate caching proxies in close logical proximity to the mobile node 18, and initiate a cache handoff as previously described.

Referring again to FIG. 2, in other embodiments, communication protocols other than Mobile IP may be utilized within the network architecture 12. In these embodiments, the cache handoff system 10 may operate similarly to the previously described embodiments. As would be understood by those skilled in the art, operation of the cache handoff system 10 may vary in these embodiments due to variations in communication protocol; however, the underlying functionality to perform cache handoffs remains similar.

The cache handoff system 10 of these embodiments may also include the previously described subscription and notification. The mobility status subscription server(s) monitoring the mobility status of the mobile node 18 may be any device(s) capable of providing mobility information related to the mobile node 18. Such devices may include, for example, at least one of the first and second mobility agents 30, 32, a home agent, at least one access router and/or any other device in the network architecture 12. In other embodiments, the mobility status subscription server may operate within the mobile node 18 to obtain mobility status.

In still other embodiments, the mobility status subscription server may communicate with other devices within the network architecture 12 to ascertain the mobility status of the mobile node 18. The other devices communicating with the mobility status subscription server may be any device(s) capable of providing information related to the location of the mobile node 18. Exemplary devices communicating with the mobility status subscription server may include the first and second mobility agents 30, 32, a home agent, at least one access router, and/or the mobile node 18. Communication of mobility status may be deduced by the mobility status subscription server as part of a standard communication protocol and/or involve information directed over the network architecture 12 to the mobility status subscription server.

In any of the previously discussed embodiments, subscribing to the mobile node 18 may involve identifying a mobility status subscription server by, for example, consulting a database, broadcasting a request, multicasting a request or any other mechanism for discovering the mobility status subscription server(s) capable of performing subscription and notification. Following identification, communication of subscribe/notification information between a caching proxy and the identified mobility status subscription server may occur.

The previously described embodiments of the cache handoff system 10 have the effect of creating a content trail within the network architecture 12. The content trail refers to different portions of the same content stream cached in different caching proxies as the mobile node 18 roams. Alternatively, an entire content stream may be cached in one caching proxy when the mobile node 18 does not roam during fulfillment of a request for streaming content. As known in the art, each caching proxy capable of serving streaming content may also cache that streaming content for subsequent requests. Within the cache handoff system 10, variably sized portions of a particular content stream (or the whole stream) may be randomly cached in different caching proxies as a function of relocation of the mobile node 18. Due to the spontaneous and unpredictable nature of the caching of streaming content, the size of the fragments of content may randomly vary.

For example, assume that a mobile node 18 has made a request and is accessing a cacheable content stream provided in response to the request. The content stream of this example is of significant length, such as, for example, a feature length movie of over two hours. As the mobile node 18 moves to different subnets, cache handoffs may be performed so that the caching proxy serving the request changes. As a result, caching of (potentially variably sized) blocks representing portions of the content stream may occur within different caching proxies.

Due to the nature of a content stream, these fragments of content are reusable and may be used to serve subsequent requests. Although the fragments of content may be useful independently, optimization may be achieved with some form of a cache co-ordination technique. A cache coordination technique may allow hosts in a subnet to not only benefit from content cached at caching proxy(s) associated with that subnet, but also benefit from utilization of content cached within caching proxy(s) associated with other subnets. Some techniques for coordination between the caching proxies to utilize distributed fragments of a content stream are known. Examples include the Internet Cache Protocol (ICP), the SQUID web proxy cache, the Cache Array Routing Protocol (CARP) and Hyper-Text Caching Protocol, Self-Organizing Cache Coordination Architecture (SOCCER). In these techniques, either fragmented content is not considered, or it is assumed that fragments/portions of the content stream are pre-arranged in a predetermined fixed distribution among the caching proxies, and are synchronized for use in serving requests. Accordingly, existing techniques do not consider a random and unpredictable distribution of fragments/portions of the content stream.

The presently preferred embodiments of the cache handoff system 10 include the capability to organize and effectively utilize this random and unpredictable distribution. Organization and effective utilization may involve at least one of manipulation of the variable sized portions of the streaming content, coordinating operation of the caching proxies and organizing the caching proxies.

Manipulation by the cache handoff system 10 of one embodiment includes functionality to quantize variable size portions of the streaming content. Quantization of the fragments may involve discarding extra lengths of the fragments and fetching additional content of the content stream to obtain a uniform sized block of content.

The quantized fragments may include any number of quanta. As defined herein, a quanta refers to a segment of a particular content stream. Each quanta may be a predetermined size, such as for example, one kilobytes, one minute or any other unit of measure to identify some portion of a content stream. The number of quanta of one or more content streams cached in a particular caching proxy may vary. Assembly of selected quanta in a predetermined sequential order may recreate a content stream. As known in the art, each content stream may be identified by a URI.

Within the cache handoff system 10, the individual quanta making up a content stream may be identified by the URI of the stream along with a quanta identifier. The quanta identifiers may identify each quanta, or may identify a group of quanta stored locally in a particular cache. The quanta identifier may be, for example, a number or any other format representative of the sequential order of the quantas forming the content stream identified by the URI. In other embodiments, other techniques may be used to maintain the sequential order of the quanta, such as, for example, a time based quanta identifier identifying the offset from the start of the content stream or any other sequential or non-sequential ordering mechanism.

In the presently preferred embodiments, the caching proxies perform quantization of the fragments cached therein. In these embodiments, the caching proxies initially cache variable sized fragments while requests for a content stream are served therefrom. Background processes within the caching proxies may quantize these fragments by discarding extra lengths of the fragments and/or pre-fetching some further content to complete the quanta. In other embodiments, quantization may be performed at the direction of other device(s) such as, for example, mobility agents, the mobile node 18 or any other device(s) in the network architecture 12 capable of directing the caching proxies.

The quanta may also serve as the unit of replacement for a cache replacement algorithm. A cache replacement algorithm is a well none mechanism for managing the storage of content within caches. In general, a cache replacement algorithm determines how a cache manages deletion of content from storage when additional storage space is required for other content. Exemplary well-known cache replacement algorithms include Least Frequently Used (LFU), Resource Based Caching (RBC) and Least Recently Used (LRU) among others.

The caching proxies within the embodiments of the cache handoff system 10 may be organized in a mesh configuration or a hierarchical configuration as previously discussed. As known in the art, caching proxies that receive a request for content stream not presently cached therein may forward such a request to other caching proxies to obtain the corresponding stream. Where fragments of the requested content stream are distributed, coordination of the caching proxies may be used to obtain the content stream. In the cache handoff system 10, coordination of the quanta cached in the different caching proxies to develop the content streams in response to requests may be performed with a centralized approach, a hybrid centralized/decentralized approach or a decentralized approach.

Figure 5:
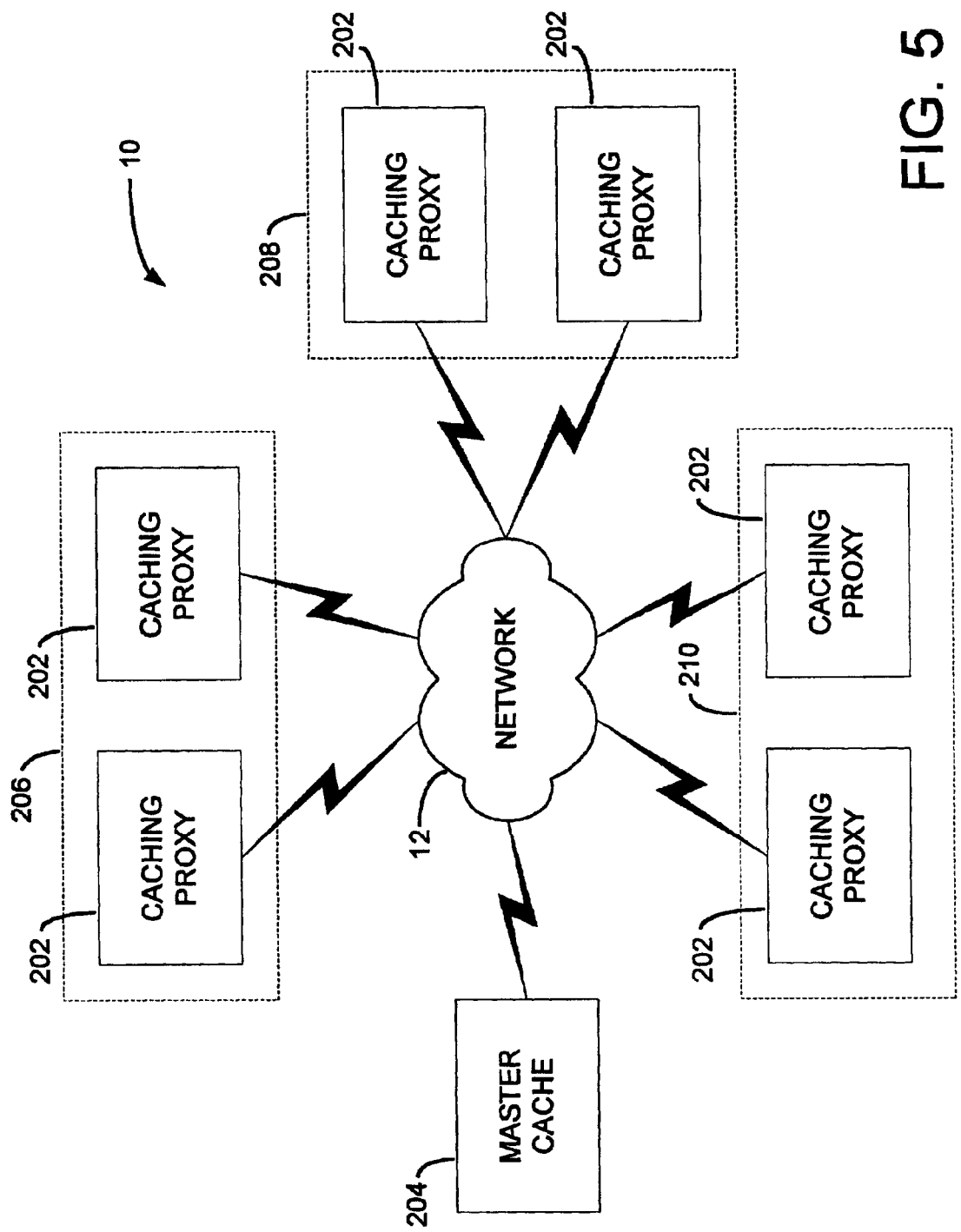
FIG. 5 is a block diagram of another embodiment of a cache handoff system.

FIG. 5 illustrates another embodiment of a cache handoff system 10. The cache handoff system 10 includes a plurality of caching proxies 202, and a master cache 204 operating within the previously discussed network architecture 12 as illustrated. The caching proxies 202 are similar to the previously described first and second caching proxies 20, 22 and may be part of the same subnet or different subnets within a content distribution network.

The master cache 204 may be any device capable of communicating over the network architecture 12 to coordinating and direct operation of the caching proxies 202. Coordination of the operation of the individual caching proxies 202 may be performed in response to requests for a content stream cached as quanta in one or more caching proxies 202. The master cache 204 may be, for example a server computer, a caching proxy, a mobility agent or any other device in the network architecture 12.

In one embodiment of the cache handoff system 10 illustrated in FIG. 5, the caching proxies 202 may operate with a centralized approach. In this embodiment, the individual caching proxies 202 communicate with the master cache 204 to maintain coordination. The master cache 204 may maintain a cache digest of the cached locations of quanta for each content stream (or portion) available at the different caching proxies 202 within the network architecture 12.

The cache digest may be, for example, a relational database, a lookup table, a separate data storage device or any other form of organizational data storage and reference. Each entry in the cache digest may include the URI and the identifier associated with each quanta, as well as the identity of the caching proxy in which the quanta is cached as local content and other related parameters. Changes in the cached content at individual caching proxies 202 may be communicated to the master cache 204 to continuously update the cache digest. During operation, the master cache 204 may satisfy requests from the mobile node 18 by selectively directing the caching proxies 202 to fulfill the requests based on quanta cached as local content therein.

In other embodiments of the cache handoff system 10 that include the master cache 204, a hybrid centralized/decentralized approach may be utilized. In these embodiments the caching proxies 202 may be organized in groups. The cache handoff system 10 may include any number of groups of any size. In the illustrated embodiment, the cache handoff system 10 includes a first group 206, a second group 208 and a third group 210. Each of the caching proxies 202 in a group 206, 208, 210 may cooperatively pool resources with each other directly to respond to requests. The master cache 204 of this embodiment acts as a source of co-ordination and resource pooling between the different groups 206, 208, 210 of caching proxies 202. One advantage of such an approach is built in redundancy. When the master cache 204 is unavailable, the individual caching proxies 202 within the groups 206, 208, 210 may continue to pool available resources to serve requests.

Pooling of resources of the caching proxies 202 involves communication among the caching proxies 202 in each group 206, 208, 210. Communication may include queries between the caching proxies 202 within the groups 206, 208, 210. The queries may include two parameters, namely, a URI and a quanta number to identify each of the quanta associated with a particular URI. The results of the queries may be stored in a cache digest associated with each of the caching proxies 202. The cache digest may be a relational database or other information collection and storage mechanism with lookup capability as previously discussed. The caching proxies 202 within each of the groups 206, 208, 210 may also multicast a multiparameter cache digest to inform the master cache 204 and the other caching proxies 202 within the groups 206, 208, 210 about the local content.

The master cache 204 of this embodiment may include a master cache digest. The master cache digest may include a concatenation (a union set) of each of the cache digests multicast by the caching proxies 202 in the groups 206, 208, 210. In one embodiment, the master cache 204 may multicast the master cache digest back to the caching proxies 202 for storage therein. The caching proxies 202 of this embodiment may store and utilize the master cache digest for coordination among the groups 206, 208, 210 when the master cache 204 is unavailable.

During operation of the cache handoff system 10, a caching proxy 202 unable to fulfill a request from within the associated group 206, 208, 210 may forward the request to the master cache 204. The master cache 204 may respond by redirecting the request to the caching proxy 202 or group 206, 208, 210 that includes the content. Alternatively, the master cache 204 may serve the request and/or query the caching proxies 202 for availability of the requested content.

In other embodiments, a plurality of master caches (not shown) may form another group similar to the groups 206, 208, 210 of caching proxies 202. In addition, a super master cache (not shown) may be included in the cache handoff system 10 to form a hierarchal organization. The super master cache may coordinate operation of the group of master caches in a manner similar to the previously discussed embodiments of the master cache 204 and the caching proxies 202.

In still other embodiments of the cache handoff system 10, coordination between the caching proxies 202 may be achieved with a decentralized technique. In this embodiment, the caching proxies 202 are capable of communicating over the network architecture 12 to establish coordination without involving a master cache 204. Each of the caching proxies 202 may include the cache digest. The cache digest may include information about the content cached locally in each of the caching proxies 202 within the network architecture 12.

The information may include the URI and identifier for quantas as well as identification of the caching proxies in which the quanta is locally cached. Accordingly, any of the caching proxies 202 may utilize the cache digest to assemble the quanta in response to a request for streaming content. In other embodiments, the caching proxies 202 may be identified with a multicast address. In this embodiment, quanta locations may be identified by multicasting queries that include a URI and quanta identifier to the caching proxies 202 within the network architecture 12 in response to a request for a content stream.

The previously discussed embodiments of the cache handoff system 10 for coordination of caching proxies may also include redundancy controls for cached content. Duplicated quanta of the same content stream may be cached in different caching proxies 202 within the cache handoff system 10 due to roaming of the mobile node 18. If duplication becomes extensive, the diversity of cached quanta within the cache handoff system 10 may be reduced due to finite amounts of caching capacity. On the other hand, eliminating duplication completely may increase network traffic due to large logical distances between the origination of a requested content stream and the quanta to serve the request, and/or dispersed quanta used in forming a content stream. Either of these extremes may result in inefficiencies in serving a content stream in response to a request.

The redundancy controls of the presently preferred embodiments of the cache handoff system 10 allow some degree of duplication to exist. The duplication may advantageously result in less overall traffic through the network architecture 12. The level of duplication may be monitored and controlled for the entire cache handoff system 10, each of the groups 106, 108, 110, a collection of the groups 106, 108, 110 or any other subset of the cache handoff system 10.

The degree of duplication may be determined by a ranking of the quanta cached in the caching proxies 202 based on operational statistics. The operational statistics may be, for example, the number of requests for the same content stream, the amount of resources required to fulfill the request for a content stream, the quantity of duplicates, any other parameter related to operation and/or some weighted combination of parameters. For example, the ranking of a quanta for which no duplicates exist may be higher than for a quanta with many existing duplicates. Similarly, a very popular quanta may be allowed higher levels of duplication. Accordingly, a popular quanta with few duplicates would have a high ranking to avoid deletion.

In one embodiment, the master cache 204 may maintain the duplication information about the quanta within the cache handoff system 10. In this embodiment, the caching proxies 202 may update the master cache 204 with changes in content cached locally. The master cache 204 may then identify and maintaining a current duplicate quanta listing.

The caching proxies 202 of one embodiment may access the listing as part of the process of determining what locally cached content should be deleted. In another embodiment, the master cache 204 may selectively direct the caching proxies 202 to delete duplicate quanta. In still another embodiment, the combination of both approaches may be utilized. In these embodiments, the processes involved with redundancy control may affect the efficiency of the operation of the caching proxies 202. Accordingly, the caching proxies 202 may be configured to maintain a portion of memory for immediate use, and run duplicate cache operations as a background process to maintain continuous availability.

The previously discussed embodiments of the cache handoff system 10 provide efficient management of streaming content requested by mobile nodes 18 within a network architecture 12. Efficient management includes optimizing performance of the network architecture 12 in servicing requests as well as minimization of traffic resulting from roaming by a mobile node 18 during the fulfillment of a request. By actively performing cache handoffs as a mobile node 18 roams from subnet to subnet, the quality of service of a content stream supplied during such roaming may be optimized. In addition, by maintaining the caching proxy in close logical proximity as the mobile node 18 roams, the routing of content streams through the network architecture 12 may be minimized. Further, the cache handoff system 10 may create and managed the quantas cached in the caching proxies as the mobile node 18 roams to optimize redundancy as well as responsiveness to requests. Accordingly, the cache handoff system 10 provides an efficient and effective system for delivering high quality streaming content to a mobile node 18 as the mobile node 18 roams throughout the network architecture 12.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of managing cacheable streaming content, the method comprising:
  a) serving a content stream to a mobile node in a first subnet with a first caching proxy in response to a request;
  b) in response to the mobile node relocating to a second subnet, handing off the request to serve the streaming content from the first caching proxy to a second caching proxy; and
  c) continuing to serve the request for the content stream to the mobile node with the second caching proxy.

2. The method of claim 1, wherein b) comprises the initial act of notifying the first caching proxy of the relocation of the mobile node.

3. The method of claim 1, wherein b) comprises identifying the second caching proxy with the first caching proxy as a function of the location of mobile node in the second subnet.

4. The method of claim 1, wherein b) comprises initiating a cache query to identify the second caching proxy.

5. The method of claim 1, wherein b) comprises initiating the hand of with the first caching proxy.

6. A method of managing cacheable streaming content, the method comprising:
  a) supplying a content stream with a caching proxy in response to a request of a mobile node located in a first subnet;
  b) caching the content stream supplied by the caching proxy;
  c) handing off the request to another caching proxy when the mobile node relocates to a second subnet;

d) discontinuing caching of the content stream with the caching proxy; and e) quantizing the fragment of the content stream cached in the caching proxy to achieve a uniform size.

7. The method of claim 6, wherein c) comprises at least one of:

discarding some of the fragment;

pre-fetching an additional part of the content stream for addition to the fragment; and leaving the fragment unchanged.

8. The method of claim 6, wherein e) comprises modifying the size of the fragment to equal a multiple of a quanta.

9. The method of claim 6, further comprising f) coordinating further utilization of the quantized fragment with another quantized fragment randomly cached in at least on other caching proxy.

10. The method of claim 6, further comprising t) communicating a uniform resource identifier (URI) and at least one quanta identifier representative of the quantized fragment to at least one of a master cache and other caching proxies.

11. The method of claim 6, wherein the quantized fragment comprises at least one quanta and the method further comprises f) selectively allowing duplicate quanta to be randomly cached in other caching proxies.

12. The method of claim 6, further comprising f) storing a uniform resource identifier (URI) and at least one quanta identifier representative of the quantized fragment in a cache digest.

13. The method of claim 6, further comprising f) ranking the fragment as a function of operational statistics; and g) controlling the degree of duplicate fragments as a function of the ranking.

14. A method of managing cacheable streaming content, the method comprising:

a) subscribing a caching proxy to a mobility status of a mobile node as a function of a request for a content stream by the mobile node and the logical proximity of the caching proxy to the location of the mobile node;

b) notifying the caching proxy that the mobile node has moved to a new location;

c) identifying a target caching proxy in close logical proximity to the new location;

d) initiating a cache handoff of the request for the content stream from the caching proxy to the target caching proxy; and e) subscribing the target caching proxy to the mobility status of the mobile node.

15. The method of claim 14, wherein a) comprises submitting credentials of the caching proxy and the identity of the mobile node to a home agent.

16. The method of claim 14, wherein a) comprises submitting credentials of the caching proxy and the identity of the mobile node to a mobility status subscription server.

17. The method of claim 14, wherein b) comprises notifying the caching proxy of the new location of the mobile node, and c) comprises initiating a cache query with the caching proxy to identify the target caching proxy.

18. The method of claim 14, wherein d) comprises communicating credentials and details of the request for the content stream to the target caching proxy.

19. The method of claim 14, wherein e) comprises:

confirming success of the cache handoff; and suspending further transmission of the content stream from the caching proxy.

20. The method of claim 14, wherein a) and b) are performed with a session initiation protocol (SIP).

21. The method of claim 14, wherein communication with the mobile node is performed with mobile Internet Protocol (IP).

22. A cache handoff system for managing cacheable streaming content request by a mobile node within a network architecture comprising a first subnet and a second subnet, the cache handoff system comprising:

a first caching proxy operable in the first subnet to supply a content stream responsive to a request of a mobile node operable in the first subnet; and a second caching proxy operable in the second subnet, the first caching proxy operable to initiate a cache handoff of the request to the second caching proxy following relocation of the mobile node to the second subnet, the second caching proxy operable to seamlessly continue supply of the requested content stream as a function of the cache handoff.

23. The cache handoff system of claim 22, further comprising a mobility status subscription server operable in the network architecture, the mobility status subscription server operable to subscribe one of the first caching proxy and the second caching proxy to a mobility status of the mobile node as a function of the supply of the content stream.

24. The cache handoff system of claim 22, wherein at least one of the first and second caching proxies are operable to discover a home agent of the mobile node.

25. The cache handoff system of claim 22, wherein the first caching proxy is operable to select the second caching proxy to receive the cache handoff based on the location of the mobile node.

26. The cache handoff system of claim 22, wherein the mobile node is operable to direct the cache handoff between the first and second cache proxies.

27. The cache handoff system of claim 22, wherein the mobile node is operable to initiate a cache query to identify the second caching proxy in the second subnet.

28. The cache handoff system of claim 22, wherein the first caching proxy is operable to discontinue supply of the requested content stream when the cache handoff is successful.

29. The cache handoff system of claim 28, wherein the first caching proxy is operable to cache the fragment of the content stream supplied prior to discontinuing supply the content stream, the fragment quantized to form at least one quanta.

30. The cache handoff system of claim 22, further comprising a master cache operable to coordinate operation of the first and second caching proxies, the first and second caching proxies operable to communicate identity of streaming content randomly cached therein to the master cache.

31. In a cache handoff system for managing cacheable streaming content requested by a mobile node within a computer network, a caching proxy serving first portion of the computer network comprising:

a streaming content server operable to supply a content stream to the mobile node in the computer network; and a request monitor operable (a) to receive the request from the mobile node to initiate the supply of the content stream; (b) following the mobile node relocating from the first portion of the computer network to a second portion of the computer network, to initiate a cache handoff to a second caching proxy serving the second portion of the computer network to allow the second caching proxy to continue the supply of the content stream to the mobile node; and (c) following the mobile node relocating from the second portion of the computer network to the first portion of the computer network, to receive a cache handoff from the second proxy, so as to continue a supply of a content stream then served from the second caching proxy.

32. A caching proxy as in claim 31, wherein the first portion of the computer network and the second portion of the computer network comprise a first subnet and a second subnet.

33. A caching proxy as in claim 31, wherein the cache proxy subscribes to a service provided by a mobility agent which tracks the network location of the mobile node.

34. A caching proxy as in claim 33, wherein the mobility agent provides to cache proxy a mobility status of the mobile node as a function of the supply of the content stream.

35. The caching proxy as in claim 31, operable to discover a home agent of the mobile node.

36. The caching proxy as in claim 31, wherein the request monitor is further operable to select the second caching proxy based on the location of the mobile node.

37. The caching proxy as in claim 31, wherein the request monitor receives directions from the mobile node to perform the cache handoff.

38. The caching proxy as in claim 31, wherein the request monitor responds to a cache query by identify the portion of the computer network served by the cache proxy.

39. The caching proxy of claim 31, wherein the request monitor is further operable to discontinue the supply of the content stream from the streaming content server when the cache handoff to the second caching proxy is successful.

40. The caching proxy as in claim 31, wherein the streaming content server caches a fragment of the content stream supplied, the fragment quantized to form at least one quantum.

41. The caching proxy as in claim 31, wherein the cache proxy cooperates with a master cache which operates to coordinate operations of the caching proxy and the second caching proxy to provide the content stream.

42. The caching proxy of claim 40, wherein the fragment of the content stream is quantized to quanta of a predetermined size.

43. The caching proxy of claim 40 wherein, to supply the content stream, the streaming content server is operable to perform one or more of: discarding some of the cached fragment, pre-fetching an additional part of the content stream for addition to the cached fragment; and leaving the cached fragment unchanged.

44. The caching proxy of claim 40, wherein the caching proxy cooperates with the second proxy to provide the content stream, the caching proxy providing a uniform resource identifier (URI) and one or more quantum identifiers representative of the cached fragment.

45. The caching proxy of claim 40, wherein the caching proxy cooperates with a master cache which operates to coordinate operations of the caching proxy and the second caching proxy to provide the content stream, the caching proxy providing the master cache a uniform resource identifier (URI) and one or more quantum identifiers representative of the cached fragment.

46. The caching proxy of claim 45, wherein the master cache causing the caching proxy and the second proxy to both cache selective quanta of the content stream.

47. The caching proxy of claim 40, wherein the streaming content server caused to be stored in a cache digest a uniform resource identifier (URI) and one or more quantum identifiers representative of the quantized fragment.

* * * * *